(12) United States Patent
Park

(10) Patent No.: US 9,526,196 B2
(45) Date of Patent: Dec. 27, 2016

(54) MULTI-PURPOSE SPADE HAVING DETACHABLE TIP

(71) Applicant: Hyun C. Park, Fontana, CA (US)

(72) Inventor: Hyun C. Park, Fontana, CA (US)

( * ) Notice: Subject to any disclaimer, the term of this patent is extended or adjusted under 35 U.S.C. 154(b) by 0 days.

(21) Appl. No.: 14/720,638

(22) Filed: May 22, 2015

(65) Prior Publication Data

US 2016/0338255 A1    Nov. 24, 2016

(51) Int. Cl.
*A01B 1/02*    (2006.01)
(52) U.S. Cl.
CPC ..................................... *A01B 1/022* (2013.01)
(58) Field of Classification Search
CPC ........................................................ A01B 1/022
USPC ....... 294/49, 51, 54.5, 56, 59; 172/372, 375, 172/381
See application file for complete search history.

(56) References Cited

U.S. PATENT DOCUMENTS

| | | | | |
|---|---|---|---|---|
| 366,099 A * | 7/1887 | Hinchman | ................ | E01H 5/02 294/56 |
| 1,571,818 A * | 2/1926 | Ternan | ..................... | A01B 1/02 294/49 |
| 4,911,249 A * | 3/1990 | Mitchell | ................ | A01B 15/02 172/719 |
| 5,887,921 A * | 3/1999 | Rapoport et al. | ........ | A01B 1/04 294/49 |
| 7,104,576 B1 * | 9/2006 | Dorr | ...................... | A01B 1/024 294/60 |
| 7,757,335 B1 * | 7/2010 | Servidio | .................. | B25G 1/10 15/235.4 |
| 8,061,745 B2 * | 11/2011 | Park | ...................... | A01B 1/022 294/49 |
| D716,117 S * | 10/2014 | Nicholson | ........................ | D8/10 |

* cited by examiner

*Primary Examiner* — Paul T Chin
(74) *Attorney, Agent, or Firm* — East West Law Group; Heedong Chae

(57) ABSTRACT

A multi-purpose spade includes a spade head having a "V"-shaped cutout; a detachable tip constructed to substantially conform to the "V"-shaped cutout of the spade head; and nuts and bolts for fastening the detachable tip to the spade head in which spade head includes first and second inner edges, and cutting edges or blades are formed on the first and second inner edges. However, such cutting edges or blades are not formed on a region adjacent to the pointed end of the "V"-shaped cutout, and first and second inner edges form an angle of about 30~40 degrees, and more preferably about 30 degrees. The first and second edge portions have longitudinal slots respectively to receive the first and second inner edges.

7 Claims, 5 Drawing Sheets

100

10

FIG.7(a)
10'
FIG.7(b)
30'
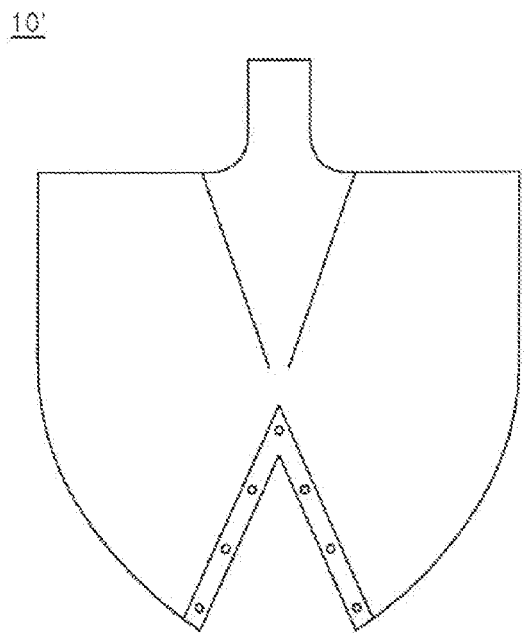
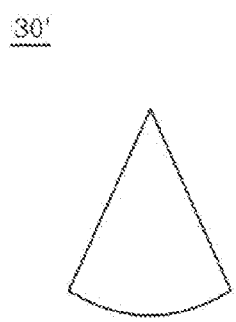
FIG.7(c)
100'
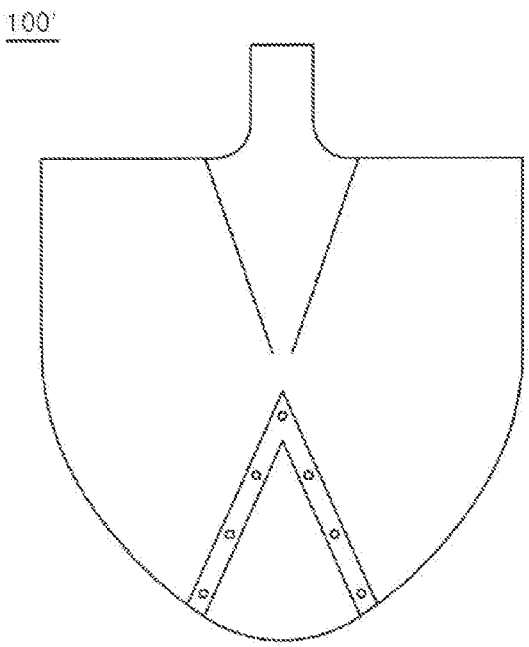

MULTI-PURPOSE SPADE HAVING DETACHABLE TIP

FIELD OF THE INVENTION

The present invention relates to a multi-purpose spade having a detachable tip and, more particularly, to a multi-purpose spade comprised of a spade head having a "V"-shaped cutout, a "V"-shaped detachable tip, and a fastening means for fastening the detachable tip to the spade head.

BACKGROUND OF THE INVENTION

Spades are generally used to dig or cut earth, sand, turf, etc., having a handle and a flat blade that can be pressed into the ground usually with a foot.

There are a number of different types of spades in different shapes, sizes and functions. In this application, spades include all digging apparatus such as spades, shovels, scrapers, diggers, trowels, soil scoops, and so forth. FIG. 1 shows certain examples of spades, having different shapes of spade heads.

U.S. Pat. No. 8,061,745 (the '745 patent) discloses a multi-purpose spade, having a central plate and an extending blade. Locking bolts are formed on the central plate and L-shaped locking slots are formed on the extending blade such that the bolts are locked into the slots to fasten the extending blade to the central plate.

However, the multi-purpose spade of the '745 patent has a relatively complicated structure. Its manufacturing process is complicated and it is very expensive to manufacture the same. The cutout of the central plate is crescent and the crescent portion may be vulnerable to damages or deformation.

Therefore, to solve the above problems, a need for a multi-purpose spade comprised of a spade head having a "V"-shaped cutout, a "V"-shaped detachable tip, and a fastening means for fastening the detachable tip to the spade head has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides a multi-purpose spade comprised of a spade head having a "V"-shaped cutout, a "V"-shaped detachable tip, and a fastening means for fastening the detachable tip to the spade head.

The object of the present invention is to provide a multi-purpose spade, which includes a spade head having a "V"-shaped cutout; a detachable tip constructed to substantially conform to the "V"-shaped cutout of the spade head; and a fastening means for fastening the detachable tip to the spade head. The detachable tip is received in the "V"-shaped cutout, and thus, the detachable tip conforms to the shape of the cutout, having a "V" shape as well.

Another object of the present invention is to provide a multi-purpose spade, which includes a spade head having a "V"-shaped cutout, a detachable tip, and a fastening means for fastening the detachable tip to the spade head. The spade head includes first and second inner edges, and cutting edges or blades are formed on the first and second inner edges. However, such cutting edges or blades are not formed on a region adjacent to the pointed end of the "V"-shaped cutout. The first and second inner edges form an angle of about 30~40 degrees, and more preferably about 30 degrees.

Still another object of the present invention is to provide a multi-purpose spade, which includes a spade head, a detachable tip, and a fastening means having first and second edge portions. The first and second edge portions have longitudinal slots respectively to receive the first and second inner edges. The fastening means can be nuts and bolts, rivet, screw, other threaded fastener, metal pin or bar, or any releasable fastening means designed for satisfactorily joining the detachable tip to the spade head. More preferably, the fastening means may be nuts and bolts such that bolts pass through holes, formed on the edge portions and inner edges, being fastened to nuts.

Still another object of the present invention is to provide a multi-purpose spade, which includes a spade head having a "V"-shaped cutout; a detachable tip constructed to substantially conform to the "V"-shaped cutout of the spade head; and a fastening means for fastening the detachable tip to the spade head. The spade head has a first inner edge and a second inner edge for forming the "V"-shaped cutout and the first and second inner edges respectively have first and second longitudinal slots for respectively receiving first and second edge portions of the detachable tip. The first and second inner edges form an angle of about 30~40 degrees, and more preferably, about 30 degrees.

The advantages of the present invention are: (1) the multi-purpose spade of the present invention includes a spade head having a "V"-shaped cutout and cutting edges are formed on inner edges of the spade head, and thus, the spade head is very effective in cutting skins of tree, moving plants or vegetables without damaging their roots, or cutting plants such as cactus as a user desires; (2) the spade head of the present invention can be additionally used to cut things such as branches or roots of trees, or peel out tree skins such as palm tree skins; (3) the cutting edges are not formed on regions adjacent to the pointed edge of the spade head, and thus, the regions can be used to pull out nails or spikes out of woods or to fasten or unfasten various sizes of nuts and bolts; (4) cutting edges can be covered by the detachable tip and thus, it is safe; (5) the detachable tip is replaceable and thus, the spade has a longer lifespan; (6) the spade head and detachable tip have a simple structure and it is inexpensive to manufacture the same; and (7) because of the "V" shape of the cutout and detachable tip, the blade can sustain greater force and is less susceptible to damages or deformation.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 4(*b*) shows a perspective view of alternative embodiment of the detachable tip;

FIGS. 7(a), 7(b) and 7(c) show a multi-purpose spade according to another embodiment of the present invention;

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
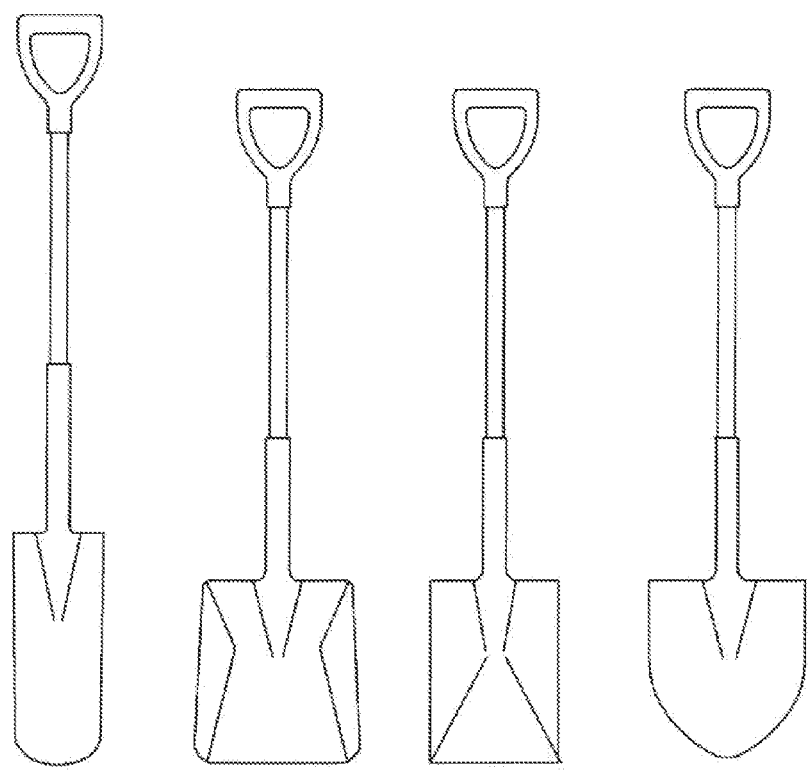
FIG. 1 shows various kinds of spades.

FIG. 1 shows various kinds of spades and the present invention can be applied to those kinds of spades. Here, the term "spade" includes all digging apparatus not just spades, but also, shovels, scrapers, diggers, trowels, soil scoops, and so forth.

Figure 2:
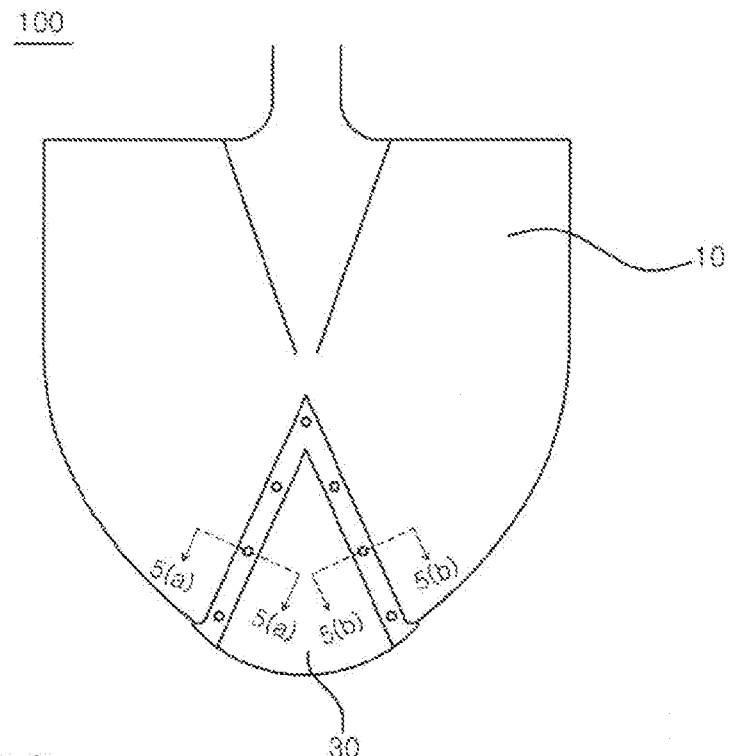
FIG. 2 shows a multi-purpose spade being comprised of a spade head and a detachable tip according to one embodiment of the present invention.

FIG. 2 shows a multi-purpose spade 100 according to one embodiment of the present invention. The multi-purpose spade 100 has a spade head 10 and a detachable tip 30 and the spade head 10 has a "V"-shaped cutout 20.

Figure 3:
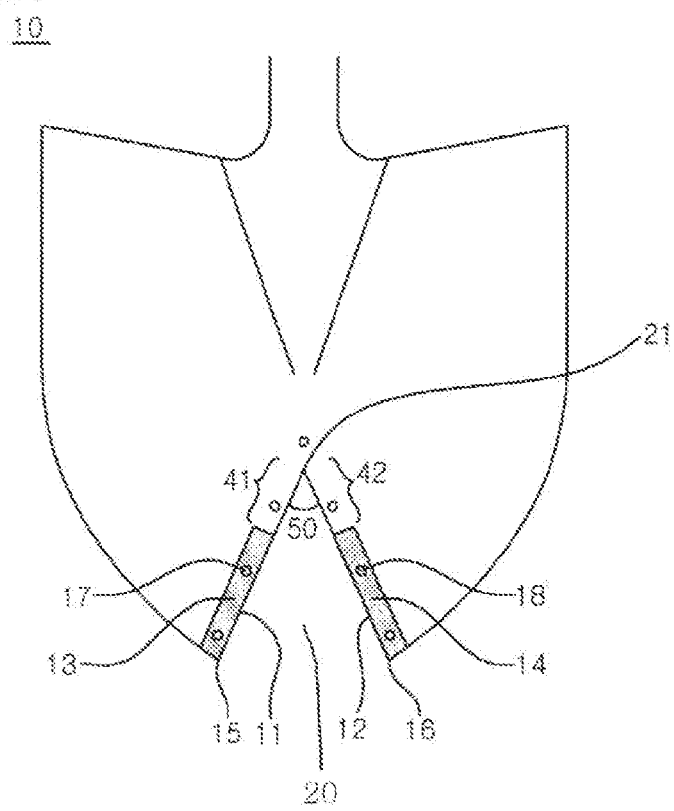
FIG. 3 shows the spade head having a "V"-shaped cutout.
Figure 4A:
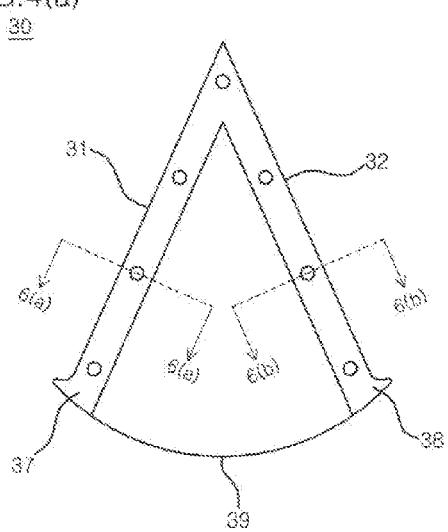
FIG. 4(*a*) shows the detachable tip.

FIG. 3 shows the spade head 10 having a "V"-shaped cutout 20 and FIG. 4(a) shows the detachable tip 30.

The multi-purpose spade 100 includes a spade head 10 having a "V"-shaped cutout 20; a detachable tip 30 constructed to substantially conform to the "V"-shaped cutout 20 of the spade head 10; and a fastening means 51 and 52 for fastening the detachable tip 30 to the spade head 10. Preferably, the spade head 10 has a thickness of about 0.65~1.2 inches, and more preferably, about 0.7~0.9 inches.

The spade head 10 comprises a first inner edge 11 and a second inner edge 12 for forming the "V"-shaped cutout 20. A first cutting edge or blade 13 is formed on the first inner edge 11 and a second cutting edge 14 is formed on the second inner edge. In FIG. 3, the first inner edge 11 is on the left and the second inner edge 12 is on the right, but that arrangement can be vice-versa. In this application, a first element is on the left and a second element is on the right, but it can be vice versa for all such first and second elements.

The cutting edges 13 and 14 are used to cut skins of tree, or cut things such as branches or roots of trees, or peel out tree skins such as palm tree skins. The cutting edges 13 and 14 can also cut plants such as cactus as a user desires. In addition, the spade head 10 can be used to move plants or vegetables without damaging their roots.

The "V"-shaped cutout 20 includes an end 21 or a pointed end 21 where the first and second inner edges 11 and 12 meet. The first cutting edge 13 is not formed on a first region 41 adjacent to the end 21. In addition, the second cutting edge 14 is not formed on a second region 42 adjacent to the end 21.

Preferably, the distance from the end 21 to the first cutting edge 13 is about 0.7~0.9 inches and the distance from the end 21 to the second cutting edge 14 is also about 0.7~0.9 inches. In other words, the lengths of the first and second regions in FIG. 3 are respectively about 0.7~0.9 inches.

The cutting edges 13 and 14 may be long or short. If they are long, the multi-purpose spade 100 is especially suitable to cut weed or its root or dig out root. On the other hand, if the cutting edges 13 and 14 are short, the multi-purpose spade 100 is suitable to dig or scoop earth with flower and move it to another place.

The first and second inner edges 11 and 12 may form an angle 50 of about 30~40 degrees, and more preferably about 30 degrees.

As shown in FIG. 3, the spade head 10 has various portions raised or curved with respect to the center of the spade head 10, and because of this structure, the first and second regions 41 and 42 can be used to pull out nails or spikes out of woods or the like or to fasten or loosen various sizes of nuts and bolts. The spade head 10 can be used as a lever to pull out nails or spikes. In addition, because of the configuration of the spade head 10, the regions 41 and 42 can be used to fasten or unfasten nuts and bolts.

Figure 4B:
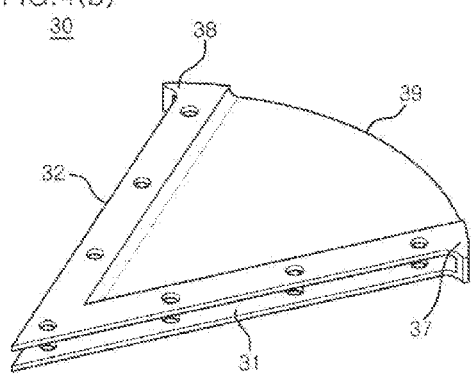

FIG. 4(b) shows a perspective view of another embodiment of the detachable tip 30. This embodiment does not have the pointed end 21. In FIGS. 4(a) and 4(b), the outer edge 39 of the detachable tip 30 may be convex and the convex may be continuous to the convex contour of the spade head 10.

Figure 5A:
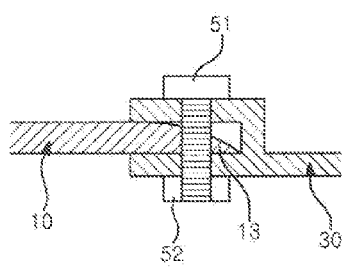
FIGS. 5(*a*) and 5(*b*) show cross-sectional views of joints between the spade head and detachable tip.
Figure 5B:
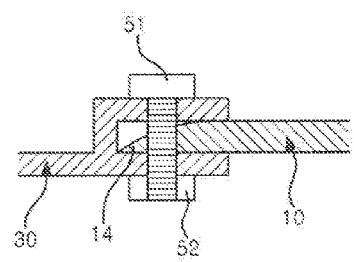
Figure 6A:
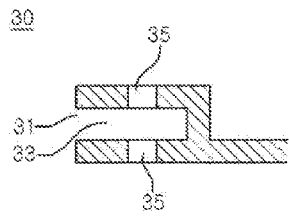
FIGS. 6(a) and 6(b) show cross-sectional views of edge portions of the detachable tip.
Figure 6B:
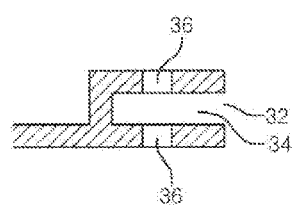

FIGS. 5(a) and 5(b) show cross-sectional views of joints between the spade head 10 and detachable tip 30, and FIGS. 6(a) and 6(b) show cross-sectional views of edge portions 31 and 32 of the detachable tip 30.

The detachable tip 30 includes a first edge portion 31 and a second edge portion 32. The first edge portion 31 comprises a first longitudinal slot 33 to receive the first inner edge 11 and the second edge portion 32 comprises a second longitudinal slot 34 to receive the second inner edge 12.

The first edge portion 31 comprises a first plurality of holes 35 on both sides of the first longitudinal slot 33 as shown in FIG. 6(a) and the second edge portion 32 comprises a second plurality of holes 36 on both sides of the second longitudinal slot 34 as shown in FIG. 6(b). In addition, the spade head 10 comprises a plurality of holes 17 and 18 on the first and second inner edges 11 and 12 corresponding to locations of the first and second pluralities of holes 35 and 36 so that bolts 51 can pass through the holes for fastening the detachable tip 30 to the spade head 10.

The fastening means may be nuts and bolts, rivet, screw, other threaded fastener, metal pin or bar, or any releasable fastening means designed for satisfactorily joining the detachable tip to the spade head. More preferably, the fastening means may be nuts 52 and bolts 51 such that the bolts 51 pass through the first or second plurality of holes 35 and 36 and the plurality of holes 17 and 18.

The first inner edge 11 includes a first tip end 15 opposite to the end 21 of the "V"-shaped cutout 20 and the second inner edge 12 includes a second tip end 16 opposite to the end 21 of the "V"-shaped cutout 20.

The first edge portion 31 of the detachable tip 30 further comprises a first covering portion 37 for covering the first tip end 15, and the first longitudinal slot 33 extends to the first covering portion 37 to cover the first tip end 15. Likewise, the second edge portion 32 of the detachable 30 further comprises a second covering portion 38 for covering the second tip end 16, and the second longitudinal slot 34 extends to the second covering portion 38 to cover the second tip end 16.

FIGS. 7(a), 7(b) and 7(c) show a multi-purpose spade 100' according to another embodiment of the present invention. In this embodiment, instead of the detachable tip 30', the spade head 10' has longitudinal slots to receive the detachable tip 30'.

The multi-purpose spade of FIG. 7(a) includes a spade head 10' having a "V"-shaped cutout; a detachable tip 30' constructed to substantially conform to an be received in the "V"-shaped cutout of the spade head 10'; and a fastening means for fastening the detachable tip 30' to the spade head 10'.

The spade head 10' includes a first inner edge and a second inner edge for forming the "V"-shaped cutout, and the detachable tip 30' includes a first edge portion and a second edge portion. In addition, the first inner edge comprises a first longitudinal slot to receive the first edge portion and the second inner edge comprises a second longitudinal slot to receive the second edge portion.

The first and second inner edges may form an angle of about 30~40 degrees, and more preferably about 30 degrees.

Figure 8A:
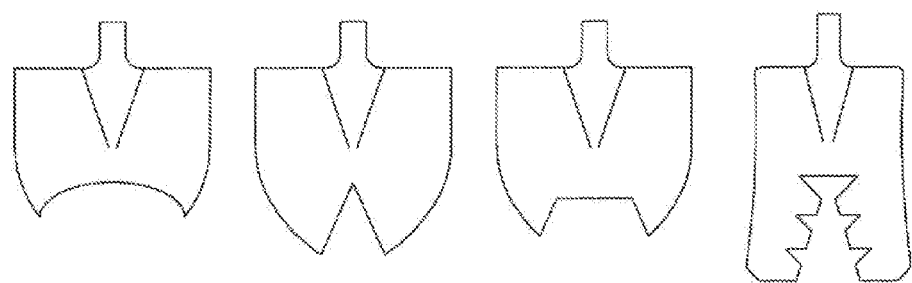
FIG. 8(a) shows various shapes of cutouts of the spade head.
Figure 8B:
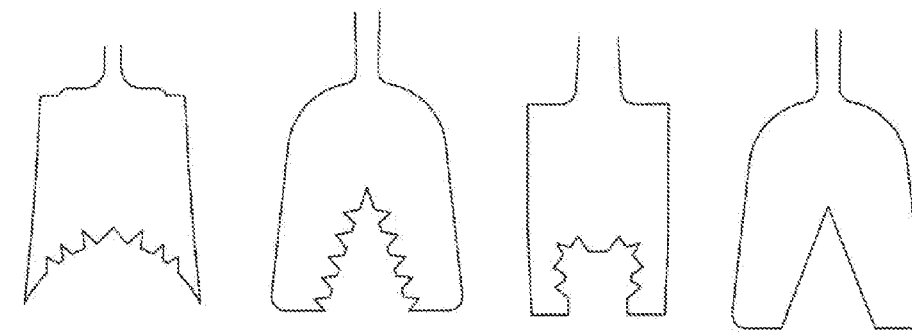
FIG. 8(b) shows another various shapes of cutouts of the spade head.

FIG. 8 shows various shapes of cutouts of the spade head. The present invention discloses the cutout 20 in a "V"-shape in detail, but it can be in various shapes as in FIG. 8. The shape of the cutout 20 is not limited to the ones in FIG. 8, but it can be in any shape as long as it can have some advantages of the present invention.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A multi-purpose spade, comprising:
   a spade head having a "V"-shaped cutout;
   a detachable tip constructed to substantially conform to the "V"-shaped cutout of the spade head; and
   a fastening means for fastening the detachable tip to the spade head,
wherein the spade head comprises a first inner edge and a second inner edge for forming the "V"-shaped cutout,
wherein a first cutting edge is formed on the first inner edge,
wherein a second cutting edge is formed on the second inner edge,
wherein the "V"-shaped cutout comprises an end where the first and second inner edges meet,
wherein the first cutting edge is not formed on a first region adjacent to the end,
wherein the second cutting edge is not formed on a second region adjacent to the end,
wherein the detachable tip comprises a first edge portion and a second edge portion, wherein the first edge portion comprises a first longitudinal slot to receive the first inner edge,
wherein the second edge portion comprises a second longitudinal slot to receive the second inner edge,
wherein the first inner edge comprises a first tip end opposite to the end of the "V"-shaped cutout and the second inner edge comprises a second tip end opposite to the end of the "V"-shaped cutout,
wherein the first edge portion of the detachable tip comprises a first covering portion for covering the first tip end,
wherein the first longitudinal slot extends to the first covering portion,
wherein the second edge portion of the detachable tip comprises a second covering portion for covering the second tip end,
wherein the second longitudinal slot extends to the second covering portion.

2. The multi-purpose spade of claim 1, wherein the distance from the end to the first cutting edge is about 0.7-0.9 inches and the distance from the end to the second cutting edge is about 0.7-0.9 inches.

3. The multi-purpose spade of claim 1, wherein the first and second inner edges form an angle of about 30~40 degrees.

4. The multi-purpose spade of claim 1, wherein the first and second inner edges form the angle of about 30 degrees.

5. The multi-purpose spade of claim 1, wherein the first edge portion comprises a first plurality of holes on both sides of the first longitudinal slot and the second edge portion comprises a second plurality of holes on both sides of the second longitudinal slot.

6. The multi-purpose spade of claim 5, wherein the spade head further comprises a plurality of holes on the first and second inner edges corresponding to locations of the first and second pluralities of holes.

7. The multi-purpose spade of claim 6, wherein the fastening means comprises nuts and bolts for fastening the detachable tip to the spade head wherein the bolts pass through the first or second plurality of holes and the plurality of holes.

* * * * *